US012768126B2

(12) United States Patent
Chen et al.

(10) Patent No.: US 12,768,126 B2
(45) Date of Patent: Oct. 20, 2026

(54) MOVABLE FOUNDATION STATIC LOAD TEST APPARATUS

(71) Applicant: Guangdong Construction Engineering Quality & Safety Testing Head Station Co., Ltd., Guangzhou (CN)

(72) Inventors: Shaoxiang Chen, Guangzhou (CN); Wenlong Lv, Guangzhou (CN); Chaohua Li, Guangzhou (CN); Zhonghua Pang, Guangzhou (CN); Guangping Li, Guangzhou (CN); Zuoping Zhang, Guangzhou (CN); Xuejun Zhang, Guangzhou (CN); Mei Yang, Guangzhou (CN); Ming Xiao, Guangzhou (CN); Shicong Wen, Guangzhou (CN); Sinan Dai, Guangzhou (CN); Yongqiao Xie, Guangzhou (CN)

(73) Assignee: Guangdong Construction Engineering Quality & Safety Testing Head Station Co., Ltd., Guangzhou (CN)

( * ) Notice: Subject to any disclaimer, the term of this patent is extended or adjusted under 35 U.S.C. 154(b) by 285 days.

(21) Appl. No.: 18/426,718

(22) Filed: Jan. 30, 2024

(65) Prior Publication Data

US 2024/0301648 A1 Sep. 12, 2024

(30) Foreign Application Priority Data

Mar. 7, 2023 (CN) ......................... 202320412529.9

(51) Int. Cl.

| | |
|---|---|
| ***E02D 33/00*** | (2006.01) |
| ***B62D 55/10*** | (2006.01) |
| ***B62D 55/12*** | (2006.01) |

(52) U.S. Cl.
CPC ............. *E02D 33/00* (2013.01); *B62D 55/10* (2013.01); *B62D 55/12* (2013.01)

(58) Field of Classification Search
CPC ........ E02D 33/00; B62D 55/10; B62D 55/12; B62D 55/08; B62D 55/084; B62D 11/20;
(Continued)

(56) References Cited

U.S. PATENT DOCUMENTS

2017/0106923 A1* 4/2017 Iwasaki .................. B62D 55/14
2018/0029852 A1* 2/2018 Mietschnig ............. B66C 23/76

FOREIGN PATENT DOCUMENTS

CN 108532654 A * 9/2018 ............. E02D 33/00
CN 217325537 U 8/2022

* cited by examiner

*Primary Examiner* — Stephen D Meier
*Assistant Examiner* — Quang X Nguyen

(57) ABSTRACT

Disclosed is a movable foundation static load test apparatus, which includes a rack, a crawler traveling mechanism and a position adjusting mechanism. The rack is configured to place a balancing weight, the crawler traveling mechanism includes a frame fixedly connected with the rack and is configured to drive the rack to travel, the position adjusting mechanism has a movable stroke moving along the vertical direction, the rack has a movable stroke moving along the vertical direction, the position adjusting mechanism is configured to adjust the distance between the rack and a test object. The crawler traveling mechanism drives the rack to travel, after reaching a test point, the distance between the rack and the test object is adjusted by the position adjusting mechanism to carry out a static load test, the rack may be conveniently moved through the crawler traveling mechanism.

8 Claims, 2 Drawing Sheets

(58) Field of Classification Search
CPC ......... Y02E 10/50; B66C 23/76; B66C 23/80; B66C 23/78
See application file for complete search history.

MOVABLE FOUNDATION STATIC LOAD TEST APPARATUS

CROSS-REFERENCE TO RELATED APPLICATIONS

This application claims priority to Chinese Patent Application No. 202320412529.9, filed on Mar. 7, 2023, which is incorporated herein by reference in its entirety.

TECHNICAL FIELD

The application relates to the technical field of foundation detection, and in particular to a movable foundation static load test apparatus.

BACKGROUND

A ballast platform counterforce apparatus is the most effective flat plate load test loading counterforce apparatus for construction engineering foundation detection recognized in the world at present, which has the obvious advantages that the stress condition is relatively close to reality, the operation is simple and easy, but when construction site detection is carried out, a large crane and workers are required to cooperate to stack and load balancing weights, even if the distance between measured points is not long, the balancing weights still needs to be repeatedly assembled and disassembled, consequently, the test scale and cost are relatively large, and the operation time is long.

SUMMARY

A main objective of the application is to provide a movable foundation static load test apparatus, aiming at providing a foundation static load test apparatus which is high in detection efficiency, low in detection cost and simple and convenient to operate.

In order to achieve the purpose, the application provides a movable foundation static load test apparatus, which includes a rack, a crawler traveling mechanism and a position adjusting mechanism.

The rack has a movable stroke moving along the vertical direction and is configured to place a balancing weight.

The crawler traveling mechanism includes a frame fixedly connected with the rack and is configured to drive the rack to travel.

The position adjusting mechanism has a movable stroke moving along the vertical direction and is configured to adjust the distance between the rack and a test object, the position adjusting mechanism includes a main hydraulic cylinder and an auxiliary hydraulic cylinder, the main hydraulic cylinder is fixedly connected with the rack, and the auxiliary hydraulic cylinder is disposed below the main hydraulic cylinder.

Optionally, a first mounting groove and a second mounting groove are formed at the front end and the rear end of the frame respectively.

The crawler traveling mechanism further includes a crawler, a driving wheel, a guide wheel, and a driving apparatus.

The crawler sleeves outside the frame.

The driving wheel is mounted in the first mounting groove and is configured to drive the crawler to rotate.

The guide wheel is mounted in the second mounting groove and is configured to guide the advancing direction of the crawler.

The driving apparatus is configured to drive the driving wheel to rotate.

Optionally, the crawler traveling mechanism further includes a thrust wheel, and the thrust wheel is disposed between the lower surface of the frame and the crawler and is configured to support the weight of the apparatus.

And/or, the crawler traveling mechanism further includes thrust wheels, and a plurality of thrust wheels are available.

Optionally, the crawler traveling mechanism further includes a supporting chain wheel, and the supporting chain wheel is disposed between the upper surface of the frame and the crawler and is configured to support the crawler.

The crawler traveling mechanism further includes supporting chain wheels, and a plurality of supporting chain wheels are available.

Optionally, the crawler includes a metal crawler or a rubber crawler.

Optionally, a base and a lifting apparatus are further included, the base is disposed below the rack, the lifting apparatus includes a driving part and a movable part, the driving part is fixedly connected with the rack, and the movable part may move along the vertical direction, is hinged with the base, and is configured to upwards lift the rack and the crawler traveling mechanism.

Optionally, two bases are available, the two bases are respectively disposed below the front end and the rear end of the rack, and each base is provided with two ball head hinged supports.

Four second lifting apparatuses are available, and movable parts of the four second lifting apparatuses are respectively hinged with the four ball head hinged supports.

Optionally, a first through hole is formed in the rack, and the main hydraulic cylinder penetrates through the first through hole and is fixedly connected with the rack.

And/or, a second through hole is formed in the rack, and the driving part of the lifting apparatus penetrates through the second through hole and is fixedly connected with the rack.

Optionally, the rack includes two cross beams, two longitudinal beams and a rack main body.

Second through holes are formed at two ends of each cross beam.

The two longitudinal beams are respectively disposed at front and rear ends of the two cross beams and configured to connect the two cross beams.

The rack main body is disposed in the middle of the two cross beams and provided with a first through hole, and the frame is fixedly connected with the rack main body.

Both the two longitudinal beams and the rack main body are welded with the two cross beams.

Optionally, the rack further includes a plurality of strengthening beams, and the plurality of strengthening beams are disposed in parallel with the longitudinal beams, and are welded with the two cross beams.

In the technical solution of the application, the crawler traveling mechanism drives the rack to travel, after reaching a test point, the distance between the rack and the test object is adjusted by the position adjusting mechanism to carry out a static load test, the whole test process is low in detection cost and high in detection efficiency, and the rack may be conveniently moved through the crawler traveling mechanism.

BRIEF DESCRIPTION OF THE DRAWINGS

In order to describe the technical solutions in the embodiments of the application or the relevant art more clearly, the drawings required to be used in descriptions about the embodiments or the relevant art will be simply introduced below, obviously, the drawings described below are only some embodiments of the application, and other drawings can further be obtained by those of ordinary skill in the art according to the drawings without creative work.

The implementation of the purpose, functional characteristics and advantages of the application will be further explained in conjunction with embodiments and with reference to the accompanying drawings.

DETAILED DESCRIPTION OF THE EMBODIMENTS

The technical solutions in the embodiments of the application are clearly and completely described below in conjunction with the accompanying drawings in the embodiments of the application. Apparently, the embodiments described are only a part rather than all of the embodiments of the application. All other embodiments obtained by those of ordinary skill in the art on the basis of the embodiments in the application without creative work shall fall within the scope of protection of the application.

It is to be noted that all directional indications (such as up, down, left, right, front, back . . . ) in the embodiments of the application are only used to explain the relative position relationship and motion between the components under a specific attitude (as shown in the accompanying drawings). If the specific attitude changes, the directional indication will change accordingly.

In addition, terms "first" and "second" in the application are only adopted for description and should not be understood to indicate or imply relative importance or implicitly indicate the number of indicated technical features. Therefore, a feature defined by "first" and "second" may explicitly or implicitly indicate inclusion of at least one such feature. In addition, the technical solutions among the embodiments can be combined with each other, but must be based on implementation of those of ordinary skill in the art. When the combination of technical solution is contradictory or impossible to implement, it shall be considered that such combination of the technical solution does not exist and is not within the scope of protection of the application.

A ballast platform counterforce apparatus is the most effective flat plate load test loading counterforce apparatus for construction engineering foundation detection recognized in the world at present, which has the obvious advantages that the stress condition is relatively close to reality, the operation is simple and easy, but when construction site detection is carried out, a large crane and workers are required to cooperate to stack and load balancing weights, even if the distance between measured points is not long, the balancing weights still needs to be repeatedly assembled and disassembled, consequently, the test scale and cost are relatively large, and the operation time is long.

Figure 1:
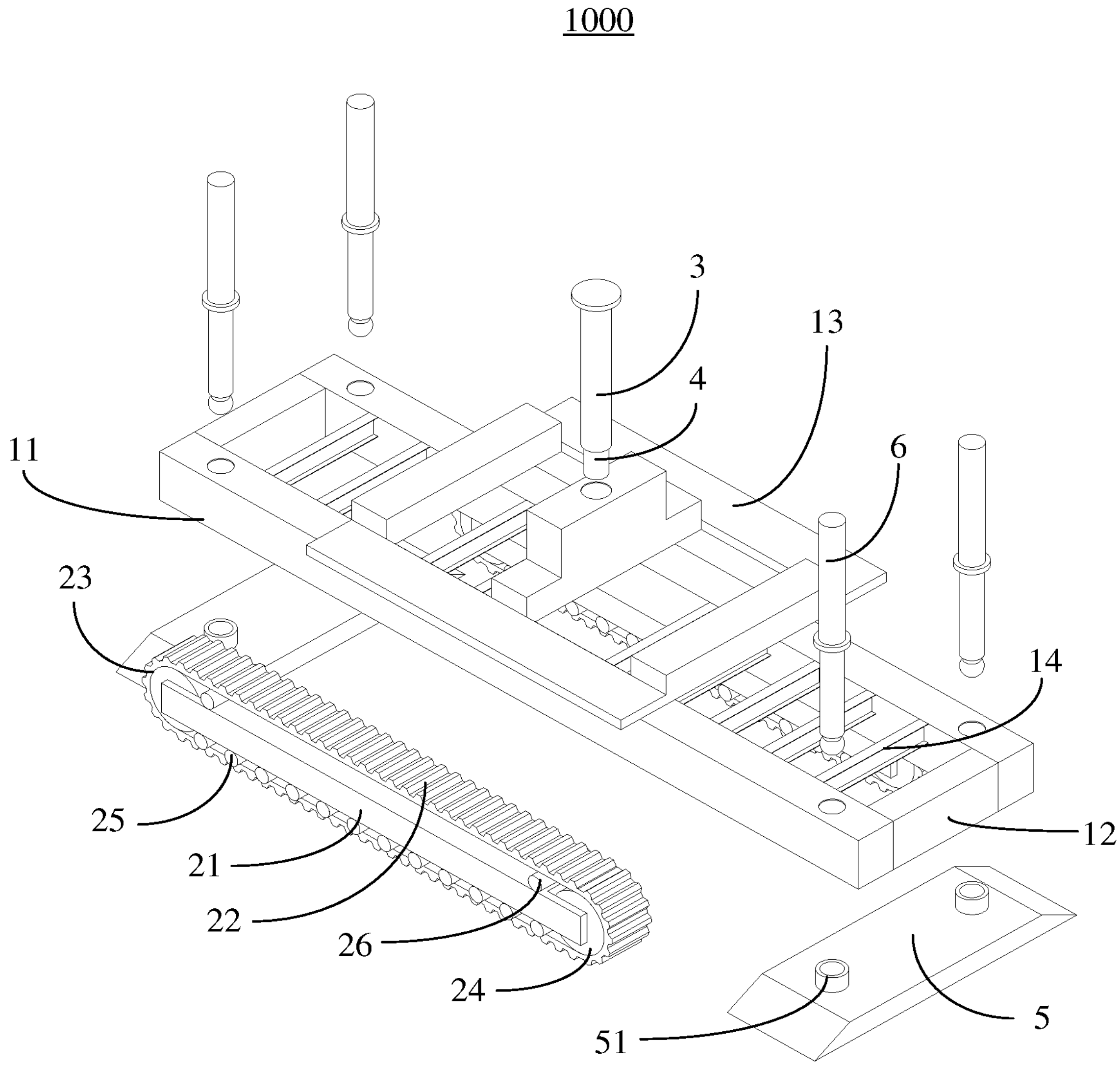
FIG. 1 is a three-dimensional schematic structure diagram of an exploded view of an embodiment of a movable foundation static load test apparatus provided by the application.
Figure 2:
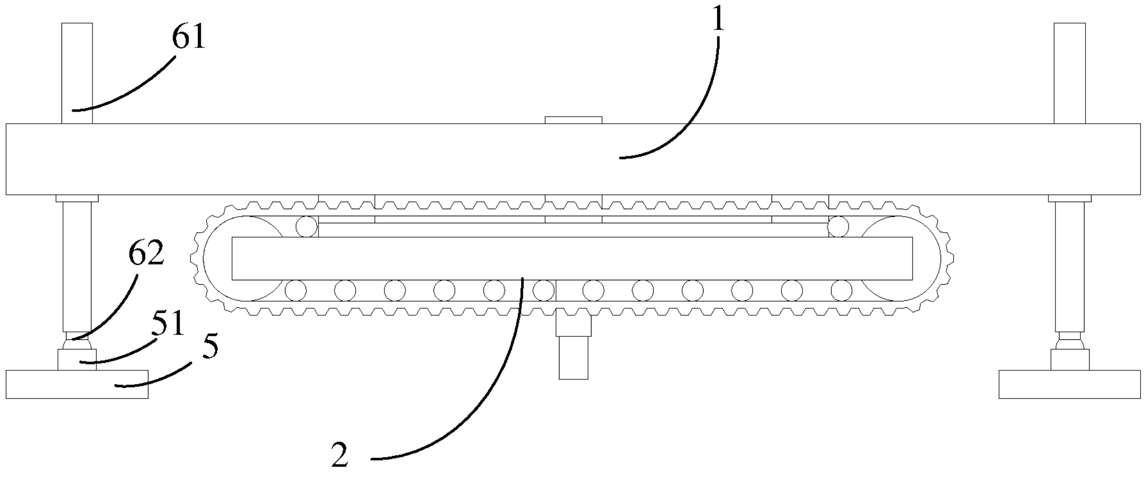
FIG. 2 is a schematic structure diagram of an embodiment of a movable foundation static load test apparatus provided by the application.
Figure 3:
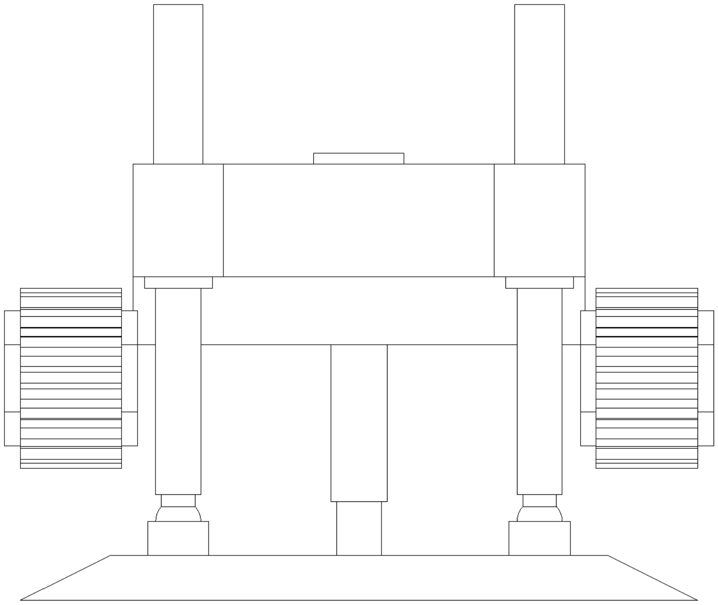
FIG. 3 is a side view of FIG. 2.
Figure 4:
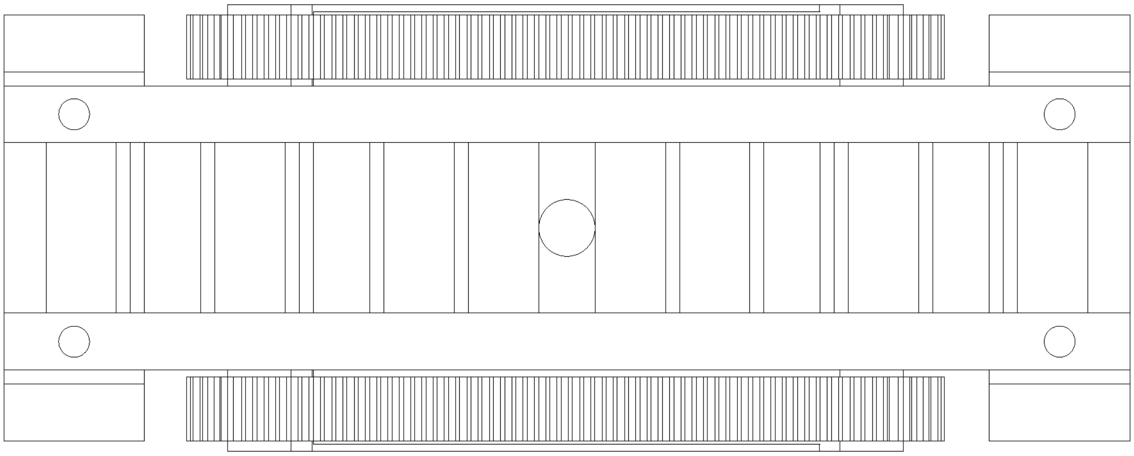
FIG. 4 is a top view of FIG. 2.

In order to solve the above problem, the application provides a movable foundation static load test apparatus, aiming at providing a foundation static load test apparatus which is high in detection efficiency, low in detection cost and simple and convenient to operate, and FIGS. 1-4 are an embodiment of the application.

Referring to FIGS. 1-4, the application provides a movable foundation static load test apparatus 1000, which includes a rack 1, a crawler traveling mechanism 2 and a position adjusting mechanism, the rack 1 is configured to place a balancing weight, the crawler traveling mechanism 2 includes a frame 21 fixedly connected with the rack 1 and is configured to drive the rack 1 to travel, the position adjusting mechanism has a movable stroke moving along the vertical direction, the rack 1 has a movable stroke moving along the vertical direction, the position adjusting mechanism may drive the rack 1 to move along the vertical direction, so as to adjust the distance between the rack 1 and a test object, the position adjusting mechanism includes a main hydraulic cylinder 3 and an auxiliary hydraulic cylinder 4, the main hydraulic cylinder 3 is fixedly connected with the rack 1, the auxiliary hydraulic cylinder 4 is disposed below the main hydraulic cylinder 3, the main hydraulic cylinder 3 is configured to adjust a large stroke distance, the auxiliary hydraulic cylinder 4 is configured to slightly adjust a distance, specifically, the main hydraulic cylinder 3 is a large stroke hydraulic cylinder, the auxiliary hydraulic cylinder 4 is a short stroke hydraulic cylinder, during work, the main hydraulic cylinder 3 extends out first, and the auxiliary hydraulic cylinder 4 extends out for slightly adjusting the distance when approaching a detection working face.

In the technical solution of the application, the crawler traveling mechanism 2 drives the rack 1 to travel, after reaching a test point, the distance between the rack 1 and the test object is adjusted by the position adjusting mechanism to carry out a static load test, the whole test process is low in detection cost and high in detection efficiency, and the rack 1 may be conveniently moved through the crawler traveling mechanism 2.

In order to drive the rack 1 to travel, in an embodiment of the application, two crawler traveling mechanisms 2 are available, which are respectively disposed on left and right sides of the rack 1, each crawler traveling mechanism 2 further a crawler 22, a driving wheel 23, a guide wheel 24, and a driving apparatus, a first mounting groove and a second mounting groove are formed at two ends of the frame 21, the crawler 22 sleeves outside the frame 21, the driving wheel 23 is mounted in the first mounting groove and is configured to drive the crawler 22 to rotate, the guide wheel 24 is mounted in the second mounting groove and is configured to guide the advancing direction of the crawler 22, and the driving apparatus is configured to drive the driving wheel 23 to rotate.

The crawler traveling mechanism 2 needs to bear a large weight, therefore, in an embodiment of the application, the crawler traveling mechanism 2 further includes a thrust wheel 25, the thrust wheel 25 is disposed between the lower surface of the frame 21 and the crawler 22 and is configured to support the weight of the apparatus, a plurality of thrust wheels 25 are available, and the plurality of thrust wheels 25 are uniformly disposed between the lower surface of the frame 21 and the crawler 22.

In order to avoid jump and lateral swing of the crawler 22 during movement, the crawler traveling mechanism 2 further includes a supporting chain wheel 26, the supporting chain wheel 26 is disposed between the upper surface of the frame 21 and the crawler 22 and is configured to support the crawler 22, the position of the supporting chain wheel 26 should be favorable for the crawler 22 to separate from the driving wheel 23 and stably and smoothly slide over the supporting chain wheel 26 while maintaining tension, and in an embodiment of the application, each crawler traveling mechanism 2 is provided with two supporting chain wheels 26.

The guide wheel 24 has two types: a toothed guide wheel and a smooth guide wheel, the toothed guide wheel has the advantage of good side orientation and small risk of deviating from the track, the smooth guide wheel has the advantages of having a middle shoulder ring, and supporting a track chain by ring faces on two sides, in an embodiment of the application, considering that the crawler traveling mechanism 2 needs to bear a large weight, the guide wheel 24 is the smooth guide wheel.

In order to maintain tension of the crawler 22, in an embodiment of the application, the crawler traveling mechanism 2 further includes a tensioning apparatus, and tension of the crawler 22 may be realized by injecting lubricating grease into the tensioning apparatus.

The crawler 22 has two types: a rubber crawler and a metal crawler, the rubber crawler has low noise, low vibration and comfortable riding, the metal crawler has good strength, stiffness and wear resistance, considering the actual use situation, in an embodiment of the application, the crawler 22 is the metal crawler.

In order to improve safety of the test, in an embodiment of the application, the movable foundation static load test apparatus 1000 further includes a base 5 and a lifting apparatus 6, the base 5 is disposed below the rack 1, the lifting apparatus 6 includes a driving part 61 and a movable part 62, the driving part 61 is fixedly connected with the rack 1, and the movable part may move along the vertical direction, is hinged with the base 5, and is configured to upwards lift the rack 1 and the crawler traveling mechanism 2.

Specifically, two bases 5 are available, the two bases 5 are respectively disposed below the front end and the rear end of the rack 1, each base 5 is provided with two ball head hinged supports 51, four lifting apparatuses 6 are available, and movable parts 62 of the four lifting apparatuses 6 are respectively hinged with the four ball head hinged supports 51, so that the rack 1 and the crawler traveling mechanism 2 may be upwards supported from a plurality of positions to improve stability.

In order to mount the lifting apparatus, in an embodiment of the application, the rack 1 includes two cross beams 11, two longitudinal beams 12 and a rack main body 13, second through holes are formed at two ends of each cross beam 11, driving parts of the four lifting apparatuses 5 penetrate through the four second through holes and are fixedly connected with the two cross beams 11 through flanges and bolts, the two longitudinal beams 12 are respectively disposed at front and rear ends of the two cross beams 11 and configured to connect the two cross beams 11, the rack main body 13 is disposed in the middle of the two cross beams 11, the frame 21 is fixedly connected with the rack main body 13, a first through hole is formed in the rack main body 13, and the main hydraulic cylinder 3 penetrates through the first through hole and is fixedly connected with the rack main body 13 through flanges and bolts.

The lifting apparatus may be a combination of a motor and a push rod, or a hydraulic cylinder, and in an embodiment of the application, the lifting apparatus 6 is a hydraulic cylinder, which has simple structure, reliable work, no transmission gap, and stable movement.

Considering the problem of strength, in an embodiment of the application, the rack 1 further includes a plurality of strengthening beams 14, the plurality of strengthening beams 14 are I beams, the plurality of strengthening beams 14 are disposed in parallel with the longitudinal beams 12, and all the two longitudinal beams 12, the rack main body 13 and the plurality of strengthening beams 14 are welded with the two cross beams 11.

The above description is preferred embodiments of the application, and is not intended to limit the scope of the application, under the disclosure concept of the application, the equivalent structural transformation performed by using the contents of the specification and the drawings of the application, or directly or indirectly applied to other related technical fields, are included in the scope of the application.

What is claimed is:

1. A movable foundation static load test apparatus, comprising:

a rack moving along a vertical direction and configured to place a balancing weight;

a crawler traveling mechanism comprising a frame fixedly connected with the rack, and configured to drive the rack to travel; and a position adjusting mechanism moving along the vertical direction and configured to adjust a distance between the rack and a test object, wherein the position adjusting mechanism comprises a main hydraulic cylinder and an auxiliary hydraulic cylinder, the main hydraulic cylinder is fixedly connected with the rack, and the auxiliary hydraulic cylinder is disposed below the main hydraulic cylinder;

a base and a lifting apparatus, wherein the base is disposed below the rack, the lifting apparatus comprises a driving part and a movable part, the driving part is fixedly connected with the rack, and the movable part may move along the vertical direction, is hinged with the base, and is configured to upwards lift the rack and the crawler traveling mechanism; wherein a first through hole is formed in the rack, and the main hydraulic cylinder penetrates through the first through hole and is fixedly connected with the rack; and/or a second through hole is formed in the rack, and a driving part of the lifting apparatus penetrates through the second through hole and is fixedly connected with the rack.

2. The movable foundation static load test apparatus according to claim 1, wherein a first mounting groove and a second mounting groove are formed at a front end and a rear end of the frame respectively;

the crawler traveling mechanism further comprises:

a crawler sleeving outside the frame;

a driving wheel mounted in the first mounting groove and configured to drive the crawler to rotate;

a guide wheel mounted in the second mounting groove and configured to guide an advancing direction of the crawler; and a driving apparatus configured to drive the driving wheel to rotate.

3. The movable foundation static load test apparatus according to claim 2, wherein the crawler traveling mechanism further comprises a thrust wheel, and the thrust wheel is disposed between a lower surface of the frame and the crawler and is configured to support a weight of the apparatus; and/or the crawler traveling mechanism further comprises thrust wheels, and a plurality of thrust wheels are available.

4. The movable foundation static load test apparatus according to claim 2, wherein the crawler traveling mechanism further comprises a supporting chain wheel, and the supporting chain wheel is disposed between an upper surface of the frame and the crawler and is configured to support the crawler; and/or the crawler traveling mechanism further comprises supporting chain wheels, and a plurality of supporting chain wheels are available.

5. The movable foundation static load test apparatus according to claim 2, wherein the crawler comprises a metal crawler or a rubber crawler.

6. The movable foundation static load test apparatus according to claim 1, wherein two bases are available, the two bases are respectively disposed below a front end and a rear end of the rack, and each base is provided with two ball head hinged supports;

four lifting apparatuses are available, and movable parts of the four lifting apparatuses are respectively hinged with the four ball head hinged supports.

7. The movable foundation static load test apparatus according to claim 1, wherein the rack comprises:

two cross beams, second through holes being formed at two ends of each cross beam;

two longitudinal beams respectively disposed at front and rear ends of the two cross beams and configured to connect the two cross beams; and a rack main body disposed in a middle of the two cross beams and provided with a first through hole, and the frame being fixedly connected with the rack main body;

wherein both the two longitudinal beams and the rack main body are welded with the two cross beams.

8. The movable foundation static load test apparatus according to claim 7, wherein the rack further comprises a plurality of strengthening beams, and the plurality of strengthening beams are disposed in parallel with the longitudinal beams, and are welded with the two cross beams.

* * * * *